United States Patent [19]

Kibe et al.

[11] Patent Number: 4,990,362
[45] Date of Patent: Feb. 5, 1991

[54] METHOD OF MANUFACTURING A TITANIUM MAGNETIC DISK SUBSTRATE

[75] Inventors: Hiroshi Kibe; Hideaki Fukai; Hiroyoshi Suenaga, all of Tokyo, Japan

[73] Assignee: NKK Corporation, Tokyo, Japan

[21] Appl. No.: 482,026

[22] Filed: Feb. 16, 1990

[30] Foreign Application Priority Data

Jun. 16, 1989 [JP] Japan .................................. 1-153861

[51] Int. Cl.⁵ .............................................. B05D 3/06
[52] U.S. Cl. ................................... 427/38; 204/192.1;
204/192.15; 427/129; 427/131; 427/132;
427/250; 427/255.2; 427/290; 427/309;
427/327; 427/328
[58] Field of Search ................. 427/38, 129, 131, 132,
427/250, 255.2, 290, 309, 327, 328; 204/192.1,
192.15

[56] References Cited

FOREIGN PATENT DOCUMENTS 52-105804  5/1977  Japan .
59-178625  10/1984 Japan .
61-199224  9/1986  Japan .
61-199232  9/1986  Japan .
63-142521  6/1988  Japan .

OTHER PUBLICATIONS

"Nihon Setchaku Kyokaishi" (Journal of the Adhesion Society of Japan), vol. 21, No. 1, 1985, p. 32.
"Titanium-Zirconium", vol. 32, No. 1, Jan. 1984, p. 19.
"Nihon Kinzoku Gakkaishi" (Journal of the Japan Institute of Metals), vol. 30, No. 1, 1966, Photo on p. 28.

Primary Examiner—Bernard Pianalto
Attorney, Agent, or Firm—Frishauf, Holtz, Goodman & Woodward

[57] ABSTRACT

Titanium magnetic disk substrates are manufactured by preparing a base by stripping not less than 5 μm from the surface layer of a titanium cold-rolled plate, and then forming a film of not less than 5 μm consisting of 1 or more non-magnetic transition metal elements belonging to Groups IVA, VA, VIA, VIIA and VIIIA of the Periodic Table, on the surface of this base.

3 Claims, 1 Drawing Sheet

METHOD OF MANUFACTURING A TITANIUM MAGNETIC DISK SUBSTRATE

BACKGROUND OF THE INVENTION

1. Field of the Invention

This invention concerns a method of manufacturing a titanium magnetic disk substrate with excellent surface properties.

2. Description of the Related Art

Magnetic disk, used as a recording medium for a computer comprises a substrate and a magnetic film formed on the substrate. The substrate is required to have the following properties:

(a) Its surface properties after precision machining or precision grinding or precision polishing must be satisfactory so that magnetic heads can run smoothly over the disk, and such that stable magnetic properties are obtained with few magnetic errors.

(b) There must be no pertuberants or holes in its surface which could lead to defects in the magnetic film formed on the substrate.

(c) It should have sufficient strength and rigidity to withstand high speed rotation when the disk is used, and precision machining during manufacture.

(d) It must be able to withstand the heat applied when forming the magnetic film.

(e) It must be lightweight and non-magnetic.

(f) It must have some degree of corrosion resistance.

Conventionally, Al-Mg or other aluminium alloys are used as substrate materials satisfying these conditions.

Recently, there has been a trend in magnetic disks toward higher recording densities and greater compactness, so the following conditions must also be met:

(A) A magnetic film which permits high recording densities is formed by sputtering, so the substrate must have sufficient heat resistance to withstand the temperature rise produced in this process.

(B) To keep spacing losses to the absolute minimum and achieve high recording densities, the fling height of the magnetic heads is reduced, so the substrate surface must be very flat and smooth in order that the magnetic heads can move smoothly over it.

Aluminium alloys such as Al-Mg alloy which were conventionally used as substrate materials however had insufficient heat resistance, and they cannot be expected to achieve higher performance.

Various magnetic disk substrates using titanium have therefore been proposed in place of the conventional aluminium alloys.

Published Unexamined Japanese Patent Application No. 52-105804, for example, discloses a magnetic disk substrate of titanium or titanium alloy with an oxide or nitride film formed by oxidizing or nitriding of the surface; Published Unexamined Japanese Patent application No. 63-142521 discloses a magnetic disk substrate comprising a core layer of titanium or titanium alloy, an insert layer, a layer of nickel, titanium, nickel alloy or titanium alloy, and a layer of glass or ceramics superimposed in that order; and Published Unexamined Japanese Patent Application No. 59-178625 discloses a disk wherein the surface of the recording medium substrate is coated with a hard valve metal or its nitride, and a layer of the oxide of said valve metal is then formed on the resulting surface. Further, Published Unexamined Japanese Patent Application No. 61-199232 discloses a magnetic medium comprising a non-magnetic substrate, a hardened non-magnetic layer covering its surface, a non-magnetic base layer of Si, Ti, Mo, W or Zr covering this hardened non-magnetic layer, and a layer of a magnetic medium covering this non-magnetic base layer; and Published Unexamined Japanese Patent Application No. 61-199224 discloses a magnetic medium comprising a non-magnetic substrate, a hardened non-magnetic layer covering the substrate, a non-magnetic base layer of $TiO_2$, TiC or TiN covering this hardened non-magnetic layer, and a layer of a magnetic medium covering this non-magnetic base layer.

However, as the average grain size of titanium is normally about 50 $\mu$m which is relatively large, discrepancies due to crystals arise during precision polishing or precision grinding when titanium is used as a magnetic disk substrate, and it is difficult to obtain satisfactory surface properties. In order to overcome this problem, (1) the grain size could be made finer by controlling forming and heat treatment, or (2) a structure could be adopted wherein a film of fine crystalline material is formed on a titanium base surface.

In the case of (1), however, a limit to grain size is reached at about 10 $\mu$m, and even with a grain size of this order, fully satisfactory surface properties cannot be obtained due to difference of crystal orientation. Further, in the case of (2), various problems arise as follows.

The above-mentioned Japanese Patent No. 52-105804 is an example of (2). In this case, there are crystals with various orientations on the titanium base surface. As the rate of oxidizing or nitriding is different depending on the orientation, it is difficult to obtain a uniform oxide or nitride film which leads to poorer yields and higher manufacturing costs. It is reported that if an oxide film is formed by oxidizing on the titanium base surface to such a thickness as to obtain high level surface properties after polishing, it is necessary to form a white oxide film of thickness not less than 1500 Å ("Nihon Setchaku Kyokaishi" (Journal of Japanese Adhesives Association), Vol. 21, No. 1, 1985, page 32). If however a white oxide film is formed on titanium, it peels off easily ("Titanium-Zirconium", Vol. 32, No. 1, Jan. 1984, page 19), hence yields decline and manufacturing costs increase. If on the other hand a nitride film is formed by nitriding on the titanium base surface to a thickness required to obtain high level surface properties after polishing, cracks appear easily in the nitride film on the surface ("Nihon Kinzoku Gakkaishi" (see Materials Transactions Japan Institute Metals), 1966, Vol. 30, photo on page 28), yields still decline and manufacturing costs increase.

The technique disclosed in the above-mentioned Published Patent Application No. 63-142521 involves a large number of manufacturing processes, so that manufacturing costs are high and manufacturing time is long. If ceramics are used for the outermost layer, adequate surface properties cannot be obtained as ceramics contain a large number of pores. In the case of glass, very high level surface properties with Ra (explained later)=approx. 0.005 $\mu$m are obtained, but the heads stick to the disk surface which is undesirable. Further, in the case of a glass surface, impurities in the glass such as Na and Ca diffuse into the magnetic film with rise of temperature when the magnetic film is formed, and these have an adverse effect on the magnetic properties of the magnetic recording medium.

Further, in the techniques disclosed in above-mentioned Published Unexamined Japanese Patent Applications Nos. 59-178625, 61-199232 and 61-199224, the base is merely coated with a layer of metal or its oxide, nitride or carbide, and surface properties after polishing cannot be said to be satisfactory.

Even with magnetic disk substrates having titanium as their principal constituent, therefore, substrates with satisfactory properties have still not been obtained.

SUMMARY OF THE INVENTION

The present invention was conceived to overcome the above problems. It is an object of the present invention to provide a method of manufacturing titanium magnetic disk substrates whereby titanium magnetic disk substrates with high level surface properties can be easily at low cost.

According to the present invention, there is provided a method of manufacturing titanium magnetic disk substrate comprising steps of preparing a base by removing not less than 5 $\mu$m from the surface layer of a titanium cold-rolled plate, and forming a film of no less than 5 $\mu$m consisting essentially of 1 or more non-magnetic transition metal elements belonging to Groups IVA, VA, VIA, VIIA and VIIIA of the Periodic Table, on the surface of the base layer.

In this arrangement, a titanium magnetic disk substrate with excellent surface properties can be obtained by simple processes.

DETAILED DESCRIPTION OF THE PREFERRED EMBODIMENTS

Figure 1:
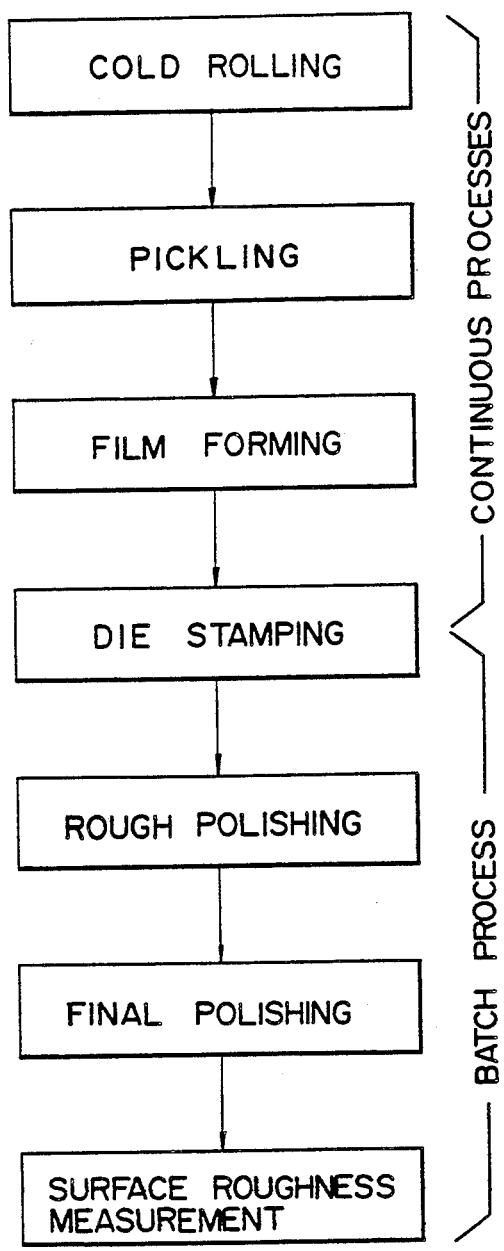
FIG. 1 is a flowchart showing one example of the method of manufacturing a titanium magnetic disk substrate of this invention.

The inventors of the present invention found, as a result of various studies carried out to improve the performance of titanium magnetic disk substrates, that a titanium magnetic disk substrate with high level surface properties can be manufactured by forming a film of certain non-magnetic transition metal elements to a specified thickness on a base prepared by removing a certain amount from the surface layer of a titanium cold-rolled plate.

More specifically, a base is first prepared by removing not less than 5 $\mu$m from the surface layer of a titanium cold-rolled plate, and a film of 1 or more non-magnetic transition metal elements belonging to Groups IVA, VA, VIA, VIIA and VIIIA of the Periodic Table is formed to a thickness of not less than 5 $\mu$m on the surface of this base so as to easily obtain a titanium magnetic disk substrate with good surface properties at low cost.

The film of non-magnetic transition metal elements may conveniently be formed by ion plating, sputtering, vacuum deposition or CVD.

In this context, the term titanium is understood to mean both pure titanium and titanium alloy.

We shall now describe this invention in more detail.

Titanium has a high melting point of about 1650° C., and so if titanium is used as a magnetic disk substrate, it has sufficient heat resistance to withstand the temperature rise of the substrate when the magnetic film is formed by sputtering. Further, by forming a film of non-magnetic transition metal elements from Groups IVA, VA, VIA, VIIA and VIIA of the Periodic Table by means of ion plating, sputtering, vacuum deposition or CVD on the titanium base, the surface can be given a very fine structure. If the grain size is large, the machinability varies due to differences in the crystal orientation of the surface. If however the surface structure is made finer as described above, the difference of orientation between adjacent crystals becomes less, therefore good surface properties can be obtained. Further, if a film of the above non-magnetic transition metal elements are formed by ion plating, sputtering, vacuum deposition or CVD, a magnetic disk substrate with excellent density can be obtained Further, the non-magnetic transition metal elements from Groups IVA, VA, VIA, VIIA and VIIIA of the Periodic Table have melting points of 1200° C. or more, and so not only the titanium base but also the film formed by these elements has adequate heat resistance when sputtering is carried out to form a magnetic film.

In a Japanese Patent Application No. 1-94391 (not disclosed) of the same applicant, Date of Application: Apr. 14, 1989, it is disclosed that a titanium magnetic disk substrate with excellent surface properties is obtained from forming a film of non-magnetic elements of the above type to a thickness of not less than 0.5 $\mu$m on the surface of a titanium base of surface properties Ra no greater than 0.05 $\mu$m.

In the method disclosed, however, in order to obtain a base with satisfactory surface properties, the base surface must be mirror finished (rough grindstone polishing—final polishing with abrasive powder), and a final polishing is also given after the film has been formed. A final polishing is therefore given twice. Further, since the final polishing process is a polish with abrasive powder which has a low polishing efficiency, the surface properties of the base must be controlled very closely. The efficiency cannot therefore be considered to be sufficiently high, and manufacturing costs are also high.

This invention, in order to obtain magnetic disk substrates with excellent surface properties at low cost, proposes a method of manufacturing titanium substrates which comprises a novel process for forming a film of non-magnetic transition metals. It is thereby possible to manufacture a titanium magnetic disk substrate with satisfactory surface properties involving only one polishing process.

Figure 2:
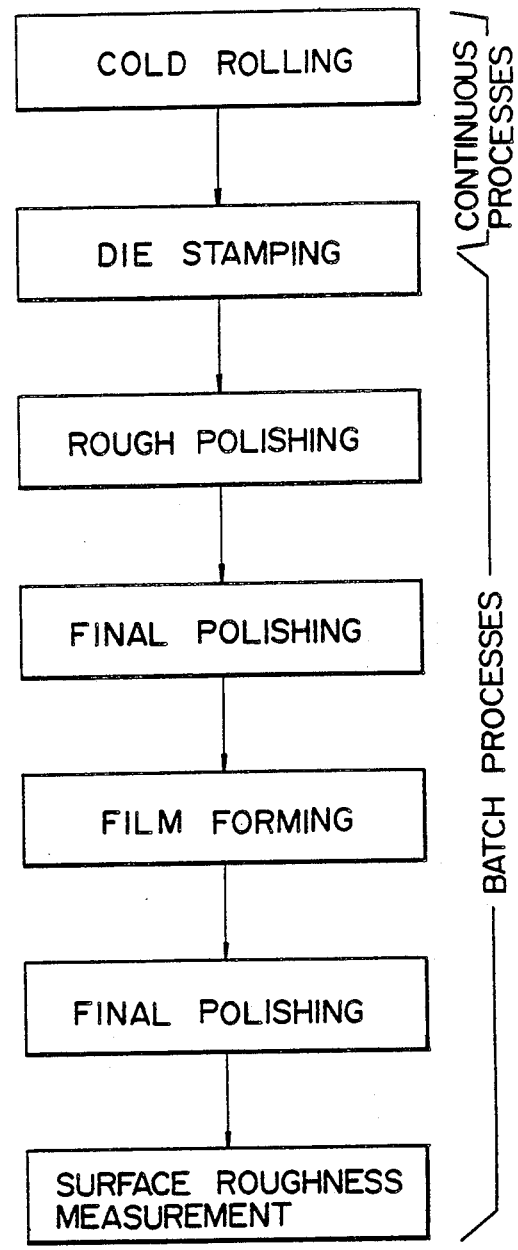
FIG. 2 is a flowchart showing comparative examples.

We shall clarify this in more detail with reference to FIGS. 1 and 2. FIG. 2 is a flowchart of the method described in the Japanese application mentioned above. As shown here, there are two final polishing processes in this method, and it is also seen that there are many batch type steps. The process of the method of this invention shown in FIG. 1, however, involves only 1 final polishing process, and it is seen that there are many continuous steps of high efficiency. From this figure, it will be clearly understood that the method of this invention is far more efficient that of the application mentioned above, and that a titanium magnetic disk substrate can be manufactured using the method at low cost.

In this invention, it is preferable to prepare the base by removing not less than 5 $\mu$m from the surface layer of the titanium cold-rolled plate. As a plastically deformed layer with cavities is formed on the surface of the cold-rolled plate, the film of non-magnetic metals peels off if it is formed directly on the cold-rolled plate. It is thus necessary to remove the surface of the cold-rolled plate by at least 5 $\mu$m in order to prevent surface peeling. Any method may be used to remove this surface portion, for example pickling, cutting or grinding.

The method used to form the film on the base may be any of the usual techniques for forming films, and ion plating, sputtering, vacuum deposition and CVD are convenient. This film, as described above, is formed from non-magnetic transition metal elements chosen from Groups IVA, VA, VIA, VIIA and VIIIA of the Periodic Table.

It is preferable that the thickness of the film is no less than 5 μm. This thickness is required so that a film with a thickness of no less than 0.5 μm is left after final polishing. More specifically if the film thickness is less than 5 μm, polishing could remove it completely, and this thickness is also insufficient to nullify the effect of the base. There is however no upper limit to its thickness from a functional viewpoint, and a suitable thickness may thus be decided according to economic viability and the method used to form the film.

After forming the film as above, the film surface is polished and the effect of the base is nullified so as to obtain the desired surface properties. In this process, excellent surface properties may be obtained by polishing with an abrasive solution or an abrasive cloth.

In this invention, therefore, a titanium magnetic disk substrate with excellent surface properties may be obtained with a relatively small number of simple processes.

EXAMPLES

We shall now describe some examples of this invention.

In these examples, circular flat plates of outer diameter 95 mm and inner diameter 25 mm were prepared as blanks from CP-2 type pure Ti cold-rolled plate of thickness 1.5 mm, and the surface of the blanks was then removed by a mixed aqueous solution of 12% nitric acid and 5% hydrofluoric acid so as to give a base. A film of the specified non-magnetic transition metals was then formed on this base by the specified methods, the film surface was ground with a grindstone and polished abrasive powder, and surface properties Ra were measured. 18 different samples were manufactured by varying the manufacturing conditions; samples in Examples 1–14 were manufactured under conditions within the range of this invention, while samples in Examples 15–18 were manufactured under conditions outside the range of this invention.

For surface properties Ra, a roughness curve is calculated by eliminating low frequency components from the outline curve of the surface obtained when the object to be measured is cut by a flat surface perpendicular to the surface to be measured. The length L of this curve in the direction of the surface is extracted, and the roughness curve is represented by $y = f(x)$ with the center line of the extracted part on the x axis, and the direction of vertical magnification on the y axis. The value of Ra is then given in μm units by the following expression (1):

$$Ra = (1/L) \int_0^L |f(x)| dx \qquad (1)$$

Table 1 shows the manufacturing conditions and surface properties for each sample.

TABLE 1

| | Sample No. | Pickling (μm) | Film-forming Conditions Method | Film thickness (μm) | Element | Surface Properties Ra (μm) | Pitting |
|---|---|---|---|---|---|---|---|
| Example | 1 | | Ion plating | 20 | Ti | 0.002 | No |
| | 2 | 5 | Ion Plating | 5 | Ti | 0.002 | No |
| | 3 | 10 | Ion plating | 10 | Ti | 0.003 | No |
| | 4 | 10 | Ion plating | 10 | V | 0.003 | No |
| | 5 | 10 | Ion plating | 10 | Cr | 0.002 | No |
| | 6 | 10 | Ion plating | 10 | Mn | 0.002 | No |
| | 7 | 10 | Ion plating | 10 | Ru | 0.002 | No |
| | 8 | 10 | Ion plating | 10 | Pd | 0.002 | No |
| | 9 | 10 | Sputtering | 10 | Ti | 0.003 | No |
| | 10 | 10 | Vacuum deposition | 10 | Ti | 0.003 | No |
| | 11 | 10 | Ion plating | 20 | Ti + Cr | 0.003 | No |
| | 12 | 10 | Ion plating | 40 | Ti | 0.003 | No |
| | 13 | 30 | Ion plating | 30 | Ti | 0.002 | No |
| | 14 | 50 | Ion plating | 30 | Ti | 0.002 | No |
| Comparative Example | 15 | 0 | Ion plating | 10 | Ti | 0.07 | Yes |
| | 16 | 3 | Ion plating | 10 | Ti | 0.09 | Yes |
| | 17 | 10 | — | — | — | 0.03 | No |
| | 18 | 10 | Ion plating | 3 | Ti | 0.03 | No |

As shown in Table 1, in Examples 1–14 wherein the manufacturing conditions are within the range of this invention, surface properties after polishing are 0.002–0.003 μm which is very satisfactory, and there was also no pitting.

On the other hand, in Comparative Example 15 wherein the surface of the cold-rolled plate had not been removed by pickling, Ra after polishing fell to 0.07 μm and there was also pitting. The same was true of Comparative Example 16 where pickling was carried out to a lesser depth. Further, in Comparative Example 17 wherein a film of non-magnetic elements was not formed, and in Comparative Example 18 wherein the film thickness was less than the lower limit of this invention, adequate surface properties were not obtained after polishing.

What is claimed is:

1. A method of manufacturing titanium magnetic disk substrates comprising steps of:
   preparing a base by removing not less than 5 μm from the surface layer of a titanium cold-rolled plate, and
   forming a film of not less than 5 μm consisting essentially of 1 or more non-magnetic transition metal elements belonging to Groups IVA, VA, VIA, VIIA and VIIIA of the Periodic Table, on the surface of the base.

2. A method of manufacturing titanium magnetic disk substrates according to claim 1, wherein said film is formed by ion plating, sputtering, vacuum deposition or CVD.

3. A method of manufacturing titanium magnetic disk substrates according to claim 1, wherein the removal of the surface layer of the titanium cold-rolled plate in said process for preparing a base is effected by pickling, cutting or grinding.

* * * * *